(12) United States Patent　　(10) Patent No.: US 7,718,887 B2
Hulen　　(45) Date of Patent: May 18, 2010

(54) APPARATUS AND METHOD FOR HARNESSING HEAT ENERGY

(75) Inventor: Michael S. Hulen, Sudbury, MA (US)

(73) Assignee: Tara Investments, LLC, Sudbury, MA (US)

( * ) Notice: Subject to any disclaimer, the term of this patent is extended or adjusted under 35 U.S.C. 154(b) by 1442 days.

(21) Appl. No.: 11/010,880

(22) Filed: Dec. 13, 2004

(65) Prior Publication Data

US 2006/0054209 A1　　Mar. 16, 2006

Related U.S. Application Data

(63) Continuation-in-part of application No. 09/946,159, filed on Sep. 4, 2001, now Pat. No. 6,831,221.

(60) Provisional application No. 60/230,628, filed on Sep. 5, 2000.

(51) Int. Cl.
　　*H01L 35/30*　　(2006.01)
　　*H01L 31/04*　　(2006.01)
　　*H01L 31/058*　　(2006.01)
　　*H01L 35/00*　　(2006.01)
　　*F03G 6/00*　　(2006.01)
　　*F03G 7/00*　　(2006.01)

(52) U.S. Cl. .................. 136/206; 136/205; 136/210; 136/253; 136/290; 136/246; 180/2.1; 180/2.2; 180/167; 52/173.1; 310/300; 310/303; 310/304; 310/305; 310/306; 60/641.1; 60/641.8; 60/641.15

(58) Field of Classification Search ........... 136/205, 136/206, 210, 253, 290, 246; 180/2.1, 2.2, 180/167; 52/173.1; 310/300, 303–306; 60/641.1, 60/641.8, 641.15

See application file for complete search history.

(56) References Cited

U.S. PATENT DOCUMENTS

| 3,900,687 A | * | 8/1975 | Meader et al. | 428/215 |
| 3,932,776 A | * | 1/1976 | Dunlay et al. | 310/306 |
| 3,971,454 A | | 7/1976 | Waterbury | 180/65.8 |

(Continued)

FOREIGN PATENT DOCUMENTS

DE　　19621979　　12/1997

(Continued)

OTHER PUBLICATIONS

Letter dated Oct. 13, 2006, from Government of India to Depenning & Depenning regarding First Application Report, Ref: Patent Application No. 486/CHENP/2003.

(Continued)

*Primary Examiner*—Jennifer K Michener
*Assistant Examiner*—Golam Mowla
(74) *Attorney, Agent, or Firm*—Sunstein Kann Murphy & Timbers LLP (57) ABSTRACT

Apparatus and method for harnessing heat energy uses at least one thermally conductive material in communication with a heat collecting material in order to conduct heat from a first region of the heat collecting material to a second region of the heat collecting material. The thermally conductive material can be interspersed within the heat collecting material and/or applied externally to the heat collecting material. Heat drawn from the second portion can be stored and/or converted into another form of energy for providing power to a structure or vehicle. Conversion can use the differential between the temperature of the second region and the temperature of a cold sink. Additional heat can be added to the heat collecting material.

64 Claims, 4 Drawing Sheets

U.S. PATENT DOCUMENTS

| | | | |
|---|---|---|---|
| 4,095,998 A * | 6/1978 | Hanson | 136/208 |
| 4,097,752 A | 6/1978 | Wulf et al. | 290/20 |
| 4,148,192 A | 4/1979 | Cummings | 60/716 |
| 4,251,291 A * | 2/1981 | Gomez | 136/206 |
| 4,338,918 A * | 7/1982 | Milburn, Jr. | 126/629 |
| 4,470,476 A | 9/1984 | Hunt | 180/65.25 |
| 4,784,700 A | 11/1988 | Stern et al. | 136/248 |
| 5,308,187 A | 5/1994 | Nix | 404/17 |
| 5,312,521 A | 5/1994 | Fraas et al. | 136/253 |
| 5,401,329 A | 3/1995 | Fraas et al. | 136/253 |
| 5,573,090 A | 11/1996 | Ross | 191/10 |
| 5,865,906 A | 2/1999 | Ferguson et al. | 136/253 |
| 5,932,029 A | 8/1999 | Stone et al. | 136/253 |
| 5,942,047 A | 8/1999 | Fraas et al. | 136/253 |
| 6,065,418 A | 5/2000 | Goldstein et al. | 114/312 |
| 6,096,966 A * | 8/2000 | Nishimoto et al. | 136/205 |
| 6,235,983 B1 | 5/2001 | Becker et al. | 136/253 |
| 6,313,391 B1 * | 11/2001 | Abbott | 136/200 |
| 6,337,437 B1 | 1/2002 | Fraas et al. | 136/253 |
| 6,380,481 B1 | 4/2002 | Muller | 123/2 |

FOREIGN PATENT DOCUMENTS

| | | |
|---|---|---|
| EP | 23 32 126 | 1/1975 |
| EP | 0 734 110 | 9/1996 |
| JP | 60-134488 | 7/1985 |
| JP | 11-220804 | 8/1999 |

OTHER PUBLICATIONS

"Use of a Thermophotovoltaic Generator in a Hybrid Electric Vehicle," Orion Morrison et al., Vehicle Research Institute, Western Washington University; printed from Internet on Aug. 16, 2001.

TPV Information: Thermophotovoltaic (TPV) Generation of Power (The Midnight Sun Generator), http://vri.etec.wwu.edu/tpv.html, Aug. 16, 2001.

Viking 29 Information: A Thermophotovoltaic Series Electric Hybrid, http://vri.etec.wwu.edu/viking-29html, Aug. 15, 2001.

Viking 29—A Thermophotovoltaic Hybrid Vehicle Designed and Built at Western Washington University, http://vri.etec.wwu.edu/viking-29-paper.html, Aug. 15, 2001.

JX Crystals Inc., Midnight Sun, http://www.jxcrystals.com, Aug. 15, 2001.

JXCrystals Inc., Midnight Sun, "InfraRed Photo Voltaics for Combined Solar Lighting and Electricity for Buildings," http://www.jxcrystals.com/building%20light.html, Aug. 15, 2001.

JXCrystals Inc., Midnight Sun, "Residential TPV Update," http://www.jxcrystals.com/residential.html, Aug. 15, 2001.

JX Crystals Inc., Midnight Sun, "World Record 35% Efficient Solar-Cell Power-Circuits for Space Satellites," http://www.jxcrystals.com/space.html, Aug. 15, 2001.

JX Crystals Inc., Midnight Sun, Company Profile, http://www.jxcrystals.com/profile.html, Aug. 15, 2001.

U.S. Appl. No. 60/127,638, filed Apr. 2, 1999.

* cited by examiner

APPARATUS AND METHOD FOR HARNESSING HEAT ENERGY

CROSS-REFERENCE TO RELATED APPLICATION

This application is a continuation-in-part of U.S. patent application Ser. No. 09/946,159 filed Sep. 4, 2001, which is scheduled to issue on Dec. 14, 2004 as U.S. Pat. No. 6,831,221 and claims priority from U.S. Provisional Patent Application No. 60/230,628 filed Sep. 5, 2000, both of which are hereby incorporated herein by reference in their entireties.

TECHNICAL FIELD

The present invention relates to systems and methods for generating power. Particular embodiments relate to systems and methods for supplementing or replacing the internal combustion engine as a source of power for vehicles. Other particular embodiments relate to providing alternative forms of stationary power generation.

BACKGROUND OF THE INVENTION

As an alternative to powering vehicles using the internal combustion engine, designers have experimented with batteries, fuel cells, and solar panels.

These experiments have been motivated, in large part, by a concern that gases emitted by internal combustion engines could harm humans by adversely affecting their environment. Motivated by these concerns, lawmakers have passed laws governing vehicle emissions.

Accordingly, there is an ongoing need for sources of power that can supplement or replace the internal combustion engine as a source of power for vehicles.

For similar reasons, there is a need for alternative stationary sources of power, that reduce harmful environmental effects associated with the combustion of fossil fuels.

SUMMARY OF THE INVENTION

In various embodiments of the present invention, heat energy is harnessed using at least one thermally conductive material in communication with a heat collecting material in order to conduct heat from a first region of the heat collecting material to a second region of the heat collecting material. The thermally conductive material can be interspersed within the heat collecting material and/or applied externally to the heat collecting material. Heat drawn from the second portion can be stored and/or converted into another form of energy for providing power to a structure or vehicle. Conversion can use the differential between the temperature of the second region and the temperature of a cold sink. Additional heat can be added to the heat collecting material.

In accordance with one aspect of the invention there is provided apparatus for harnessing heat energy. The apparatus includes a heat collecting material and at least one thermally conductive material in communication with the heat collecting material for conducting heat from a first region of the heat collecting material to a second region of the heat collecting material. The heat collecting material can be, for example, a paving material for forming a pavement, a roofing material, or a siding material. The pavement can be, for example, a parking lot or roadway.

In accordance with another aspect of the invention there is provided a method for harnessing heat energy. The method involves applying a heat collecting material to a surface and placing at least one thermally conductive material in communication with the heat collecting material for conducting heat from a first region of the heat collecting material to a second region of the heat collecting material. The heat collecting material can be, for example, a paving material for forming a pavement, a roofing material, or a siding material. The pavement can be, for example, a parking lot or roadway.

Thermally conductive materials include, but are not limited to, thermally conductive rods, thermally conductive wires, thermally conductive shavings, thermally conductive particles, thermally conductive pipes, thermally conductive film or tape, thermally conductive wire mesh or screen, pipes carrying thermally conductive liquid, and pipes carrying thermally conductive gas. Thermally conductive materials may be interspersed within the heat collecting material, either throughout the heat collecting material or through a portion of the heat collecting material. The thermally conductive material(s) may form a layer within the heat collecting material. A thermally conductive material layer may additionally or alternatively be placed external and adjacent to one or more heat collecting material layers. A thermally conductive material surface layer may transmit visible light but substantially prevent heat from escaping through the thermally conductive layer. Density and/or combination of thermally conductive materials may be increased near the second region. A thermal insulating material may be used to reduce heat loss from the heat collecting material. The first region may be an insulated region and the second region may be an uninsulated region.

Heat may be received from the second region and converted to another form of energy for providing power to a structure or vehicle. Such conversion may derive power from a temperature differential, and may involve the use of a Stirling cycle engine or a Brayton cycle engine. A cold sink may be used to aid in establishing the temperature differential. The relatively constant temperature subterranean earth can be used as the cold sink, for example, using thermally conductive media such as subterranean pipes that circulate fluid, wires, rods, or pipes. Alternatively or additionally, heat may be obtained from the second region and stored. Additional heat may be added to the heat collecting material.

Further related embodiments of each of these embodiments are also disclosed.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

Figure 1:
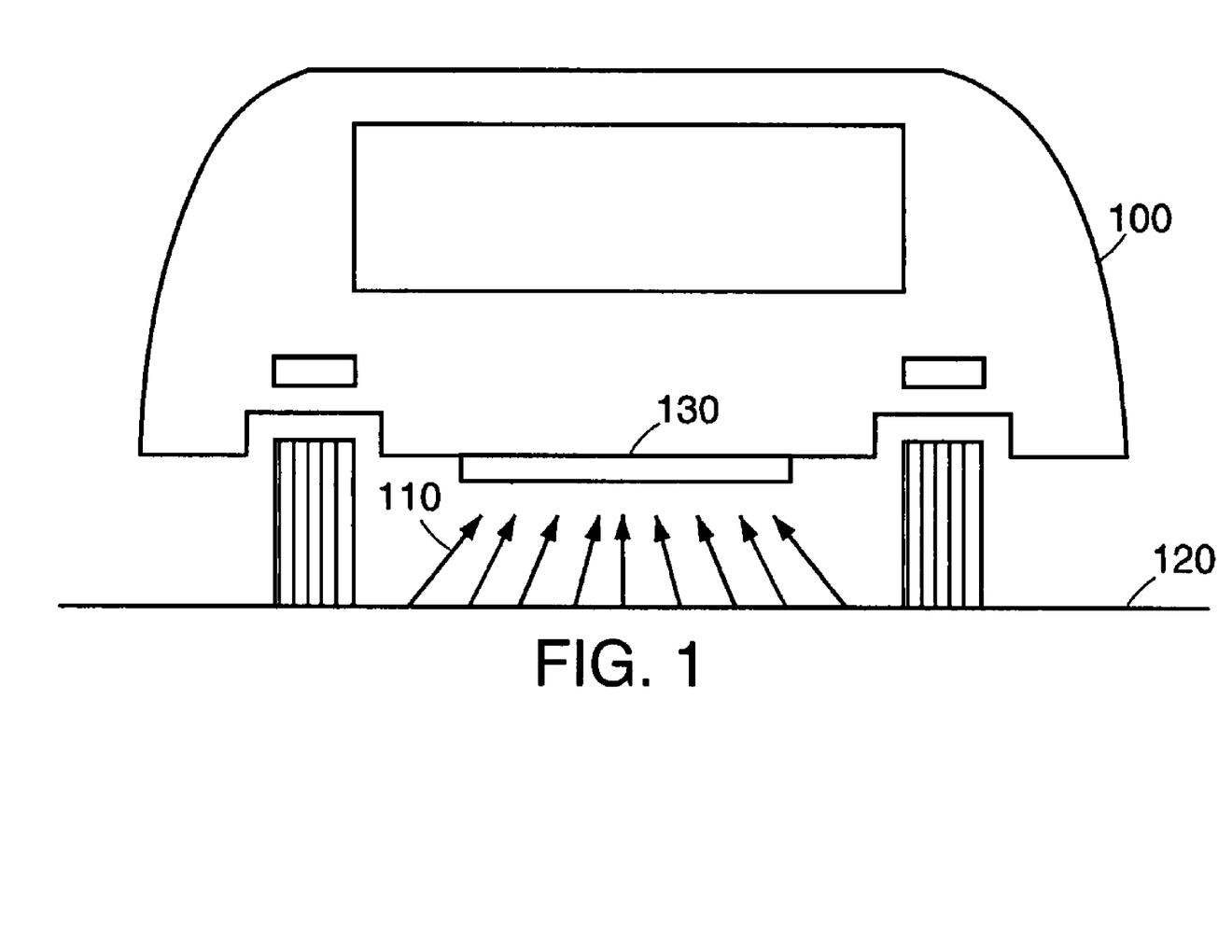
FIG. 1 shows a method for powering a vehicle, in accordance with an embodiment of the invention.

FIG. 1 shows a method for powering a vehicle, in accordance with an embodiment of the invention. A vehicle 100 uses a receptor 130 to receive infrared radiation 110 emitted as heat from surface 120. The receptor 130 converts energy of the infrared radiation to a form of energy that is useful for providing power to the vehicle 100. Receptor 130 may be, for example, a thermophotovoltaic cell (also called an infrared photovoltaic cell), positioned to receive heat emitted from the surface of a road or parking lot. Examples of such thermophotovoltaic cells are described in U.S. Pat. No's. 4,784,700; 5,312,521; 5,865,906; 5,932,029; 5,942,047; and 6,235,983, the disclosures of which are hereby incorporated herein by reference. Power generated using receptor 130 may be used to supplement power provided by other means, such as by an internal combustion engine, batteries, fuel cells, or solar panels. Receptor 130 need not be mounted facing downwards from the bottom of vehicle 100, but may also be mounted in other angles and positions to increase receipt of infrared radiation. For example, it may also be mounted on the front, rear, sides, or roof of the vehicle; on a stand on top of the vehicle; on a trailer attached to the vehicle; or on an arm extending from the vehicle. In one embodiment, electric power produced by receptor 130 from receiving infrared radiation is used to power an electric motor of vehicle 100, or to provide supplemental power to such a motor; or to charge a battery of vehicle 100. For example, power from receptor 130 may charge the battery of an electric vehicle (or hybrid electric vehicle) either while the vehicle is parked or while it is in motion. Receptor 130 need not be permanently mounted on vehicle 100, but may also be detachable or retractable. In one embodiment, a retractable or detachable screen or umbrella houses a plurality of infrared receptors 130. It should be noted that receptor 130 need not receive radiation only from surface 120, but may also receive it from other nearby objects, depending on receptor 130's position and orientation. For example, receptor 130 may receive radiation from the surfaces of neighboring cars in a parking lot, or from a surface (such as the roof) of vehicle 100 itself. Receptor 130 also may receive some infrared radiation directly from sunlight. Additionally, an infrared filter may be used to filter incident radiation to optimum wavelengths for power generation, prior to receipt of the radiation by receptor 130. In one embodiment, a thermophotovoltaic cell (or other infrared receptor) is cooled by thermal contact with a container of liquid nitrogen or hydrogen, or another cold source within the vehicle, since some infrared receptor materials operate more efficiently at low temperatures.

Figure 2A:
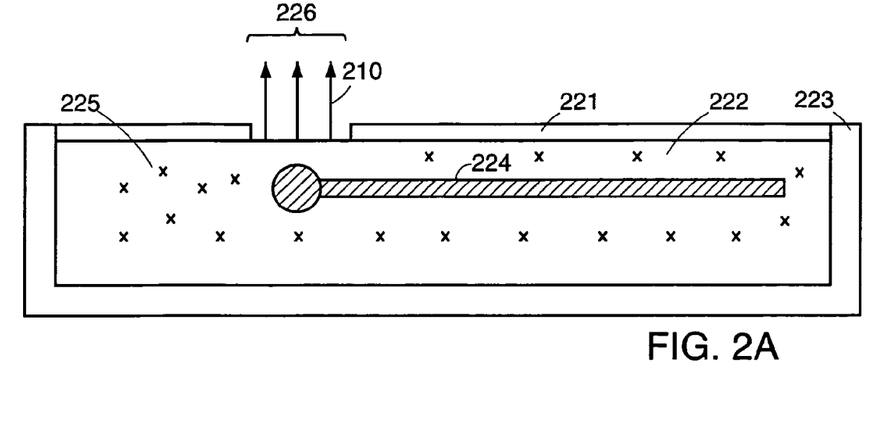
FIGS. 2A and 2B show cross-sectional views from the side and from above (respectively) of a roadway specially designed to deliver heat to a vehicle (such as the vehicle of FIG. 1) in accordance with an embodiment of the invention.
Figure 2B:
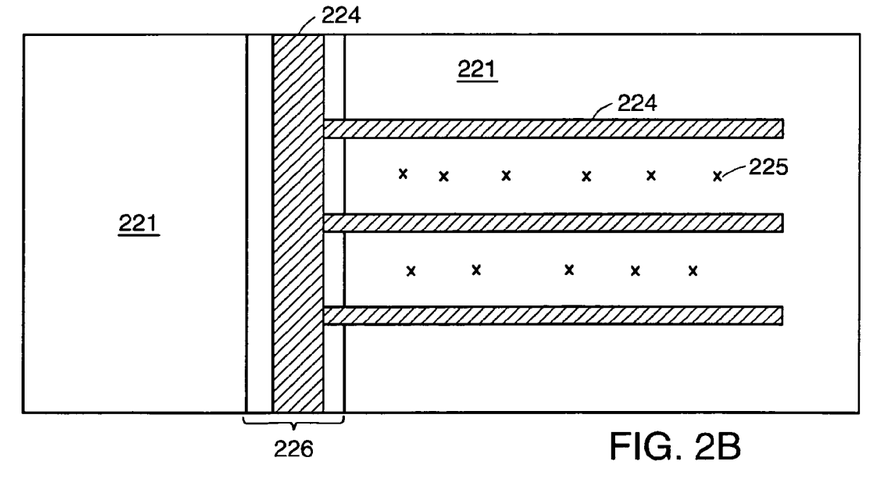

FIGS. 2A and 2B show cross-sectional views from the side and from above (respectively) of a roadway specially designed to deliver heat to a vehicle (such as the vehicle of FIG. 1) in accordance with an embodiment of the invention. In FIG. 2A, a top layer 221 of a roadway transmits sunlight in the visible portion of the solar spectrum to an asphalt layer 222 below, but does not transmit infrared radiation emitted as heat from the surface of asphalt 222. Top layer 221 thus traps heat within the asphalt layer 222. Top layer 221 may be formed, for example, of glass or silica, or any material that transmits visible light but blocks infrared radiation; asphalt layer 222 need not be made of asphalt, but may be made of any material useful for collecting heat while also supporting a vehicle. Heat-conducting channels, such as copper pipes 224, conduct the trapped heat to "window" regions 226 that are not insulated by a top layer 221. The roadway thus releases infrared radiation 210, collected from the trapped heat, as heat from the surface of window region 226. Such released infrared radiation may be directed onto a vehicle's infrared receptor, such as receptor 130 of FIG. 1. In this fashion, heat produced by solar radiation incident on a specially designed roadway may be harnessed to provide useful energy to a vehicle. In one embodiment, infrared radiation from the window region 226 is concentrated before being received by receptor 130; such concentration may be achieved, for example, by positioning a lens, structured emissive plate, or parabolic reflector over the window region. Thermal insulation 223 (such as rubber) underneath asphalt layer 222 assists in keeping asphalt layer 222 hot. Thermally conductive material 225 (which may be, for example, shavings of copper or another metal, or berylium or lithium salts) may be dispersed throughout asphalt layer 222 to assist in conducting heat to window region 226.

FIG. 2B shows a cross-sectional view of the roadway of FIG. 2A from above, with window region 226 configured as a lengthwise strip that may deliver energy to receptor 130 while vehicle 100 is moving.

Figure 2C:
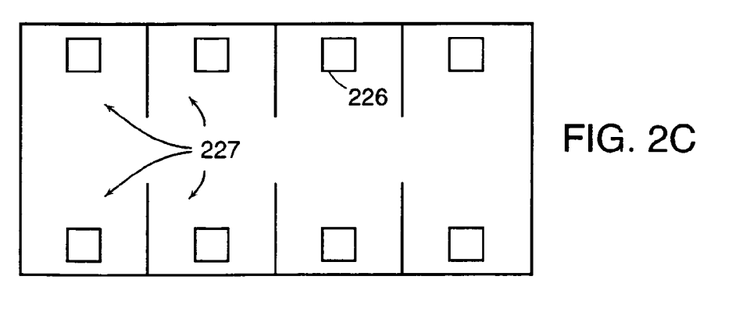
FIG. 2C shows a parking lot, constructed in a similar fashion to the roadway of FIGS. 2A and 2B, in which rectangular window regions 226 emit heat in each parking space 227, in accordance with an embodiment of the invention.

FIG. 2C shows a parking lot, constructed in a similar fashion to the roadway of FIGS. 2A and 2B, in which rectangular window regions 226 emit heat in each parking space 227, in accordance with an embodiment of the invention. A vehicle such as vehicle 100 of FIG. 1 that converts infrared radiation to useful energy may use receptor 130 to receive heat emitted from window region 226, while the vehicle is parked in parking space 227. This heat may be used, for example, to charge the vehicle's battery (as described above for FIG. 1). When a given parking space 227 is not being used, its window region 226 may be covered with a thermally insulating plate, which may be made of the same material as top layer 221. A network of heat-conductive channels 224 may be arranged to connect all of the window regions 226 in the parking lot, thereby allowing heat to flow from unused parking spaces to ones that are being used.

In a related embodiment according to the invention, a window region 226 of FIGS. 2A-2C is opened only at the location of the vehicle, while the rest of the roadway is thermally insulated with top layer 221. A system of shutters is formed in top layer 221. Each shutter of thermally insulating material 221 is opened as the, vehicle passes, and may be triggered by a laser, magnetic, or other device that senses the vehicle's presence. The shutter may be opened by mechanical, liquid crystal, optical MEMS, or other switching devices. In one embodiment, a receptor 130 on the side of a vehicle is positioned to receive heat emitted from a vertical side rail, that runs along the side of a roadway constructed in the manner of FIGS. 2A and 2B. The vertical side rail is fitted with a switching shutter system, so that heat collected from the roadway is transferred to the vertical side rail, and released through a shutter to receptor 130 as the vehicle passes. Infrared radiation emitted through such a shutter may be focused using, for example, a lens, a structured emissive plate, or a parabolic reflector. For mass production of a shuttered roadway system, an adhesive backing may be formed on a lens-shaped strip, and the strip applied behind a series of shutters. In another embodiment, a shutter or window region 226 is automatically triggered to open when a vehicle parks above it, thereby allowing charging of the vehicle's battery, and to close when the vehicle leaves.

In further embodiments according to the invention, non-solar heat sources provide heat to the window regions 226 of the embodiments of FIGS. 2A-2C. For example, an electric heating cable, a natural gas burner, a steam pipe, or another supplemental heat source may be mounted in window region 226 in order to provide heat to the vehicle from such regions when the amount of solar energy falls below a desired level; or to supplement solar heating.

In another embodiment according to the invention, the roadways of FIGS. 2A-2C are constructed using gradients or layers of materials having varying thermal capacitances or conductances, in order to promote delivery of heat to window regions 226. Additionally, light may be focused or reflected onto the surface of the roadways of FIGS. 2A-2C, using, for example, Fresnel lenses or mirrors, in order to increase the energy received from incident solar radiation.

In a further embodiment according to the invention, the roadway constructions of FIGS. 2A-2C are used to provide a source of stationary power generation. A roadway surface (such as a driveway or parking lot) near a building (such as a home, apartment building, or office building), is constructed in the manner of the embodiments of FIGS. 2A-2C. A receptor, similar to the vehicle-mounted receptor 130 of FIG. 1, converts energy from infrared radiation, emitted from window regions of the roadway surface, to a form of energy that is useful for providing power to the building. Thus, for example, a thermophotovoltaic cell mounted above the surface of a parking lot constructed as described for FIG. 2C produces power for an office building by collecting heat from window regions of the parking lot surface. In another example, a thermophotovoltaic cell produces power for a home by collecting heat from window regions formed in a driveway surface. Such thermophotovoltaic cells may be electrically connected to the building using power cables or other electrical connections.

In a similar embodiment, the roof of a building is used to generate power in a manner similar to that of the embodiments of FIGS. 2A-2C. In one example, a heating layer of a building's roof is coated with an infrared blocking coating, in an analogous manner to the coating of top layer 221 onto asphalt layer 222 in FIGS. 2A and 2B. The roof's heating layer may be formed of any substance useful for collecting heat, and may be mounted as a separate panel onto a conventionally-constructed roof, or may be part of the roof structure (such as the shingles, tiles, or other roofing layer) itself. In the latter case, energy-producing roofing sheets may be mass-produced in flexible rolls in accordance with an embodiment of the invention, and may be made with an adhesive layer for fastening them to the roof. The heating layer may also be thermally insulated from below, and contain heat-conductive elements, in a similar manner to elements 223-225 of FIGS. 2A-2B. In one embodiment of a roofing system, infrared radiation emitted from window regions 226 in the roof is received by a receptor, such as a thermophotovoltaic cell, which then provides power to the building. In another embodiment of a roofing system, the roof surface lacks window regions 226. Instead, heat collected in the heating layer is transferred out of the roof (for example by heat-conducting metal channels, radiator structures, and/or light pipes) and received by a receptor, such as a thermophotovoltaic cell, which then provides power to the building. In a further embodiment, siding panels for a building are used to generate power in a manner similar to that just described for roofing.

In a further similar embodiment, a flexible mat is formed, in a manner analogous to that of the embodiments of FIGS. 2A-2C. In one example, thin copper traces conduct heat within a middle heating layer of the mat, formed of a dark, flexible material. A top layer of the mat is formed of a flexible material that transmits visible light and blocks infrared radiation. If a window region 226 is formed in the top layer of the flexible mat, infrared radiation from the window region is harnessed by a receptor (such as a thermophotovoltaic cell). Alternatively, the mat may have no window region 226, with heat instead being transmitted out of the heating layer by other methods (for example by a heat-conductive wire, a radiative structure, and/or a light pipe) to a receptor. The flexible mat may have leads or cables through which its generated power is conducted. Such a mat may be used, for example, to charge a parked vehicle's battery, by laying the mat on the vehicle's roof and connecting its leads to the vehicle's battery.

Figure 3:
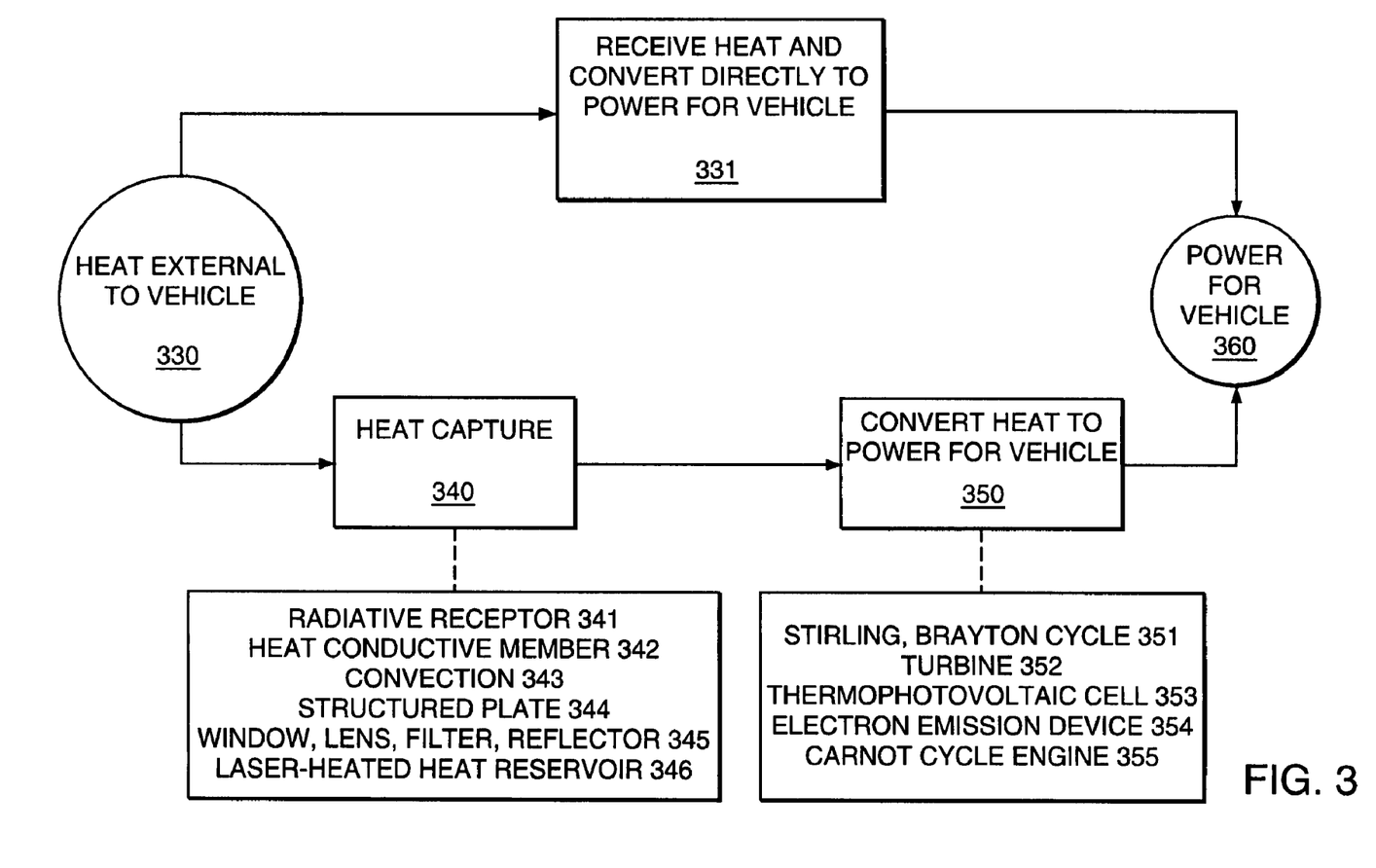
FIG. 3 is a conceptual block diagram of two sets of embodiments according to the invention for powering a vehicle.

FIG. 3 is a conceptual block diagram of two sets of embodiments according to the invention for powering a vehicle. In both sets of embodiments, energy from heat 330, from a source external to the vehicle, is used to provide power for the vehicle 360. In the first set of embodiments 331, heat is received and converted directly into power for the vehicle. For example, in an embodiment according to FIG. 1, a thermophotovoltaic cell converts infrared radiation emitted as heat from surface 120 directly into power for vehicle 100. In the second set of embodiments, separate steps are performed of capturing the heat 340 and converting it into power for the vehicle 350. Several different possible techniques 341-346 are described for separately capturing the heat, as well as several different possible techniques 351-355 for separately converting it into power for the vehicle, in accordance with the second set of embodiments of FIG. 3.

In a first embodiment for separate heat capture, a radiative receptor 341 receives radiation from a source of heat external to the vehicle. The radiative receptor 341 may have fins or other structures that increase its surface area, and may have a blackened or anti-reflection coating, or surface relief structures, in order to promote receipt of radiation. In one embodiment, the radiative receptor 341 is formed as part of a body panel of the vehicle. The radiative receptor 341 may also be able to be lowered towards, or onto, a hot surface (such as a roadway) to increase heat transfer. A heat-conductive material, which may be a recirculating flow of liquid (such as water or liquid hydrogen) or a metal (such as copper) transfers heat from the radiative receptor 341 into the vehicle, for conversion in step 350 to useful power for the vehicle.

In a second embodiment for separate heat capture, a heat conductive member 342 contacts a source of heat external to the vehicle, such as a heated roadway surface. The heat conductive member 342 may contact the heat source while the vehicle is stationary or when it is moving. In either case, the heat conductive member 342 should be made of a highly heat conductive material, such as copper. In one embodiment, the vehicle drags a heat conductive wheel or bundle of heat conductive fibers along a surface while the vehicle is in motion; such fibers may be coated with heat-conductive, wear-resistant materials, such as diamond-like carbon. The heat conductive member 342 conducts heat into the vehicle, where it is converted to useful power for the vehicle in step 350.

In a third embodiment for separate heat capture, heat is captured using convection 343. For example, a fan or blower may be used to circulate hot air into the vehicle, or within the vehicle. Such a fan or blower may be positioned near the surface of a hot object within the vehicle, or a heated external surface (such as a roadway). Heat captured using convection 343 is subsequently converted to useful power for the vehicle in step 350.

It will be observed that the first three embodiments for separate heat capture involve heat transmitted by emission of infrared radiation, by conduction, and by convection. Other particular methods of heat capture than those described above may be used in accordance with embodiments of the invention, that involve these three modes of heat transmission (emission of radiation, conduction, and convection).

In a fourth embodiment for separate heat capture, heat is collected using a blackened, anti-reflection, or sub-wavelength structured plate 344, and transmitted into the vehicle for conversion to useful power.

Figure 4:
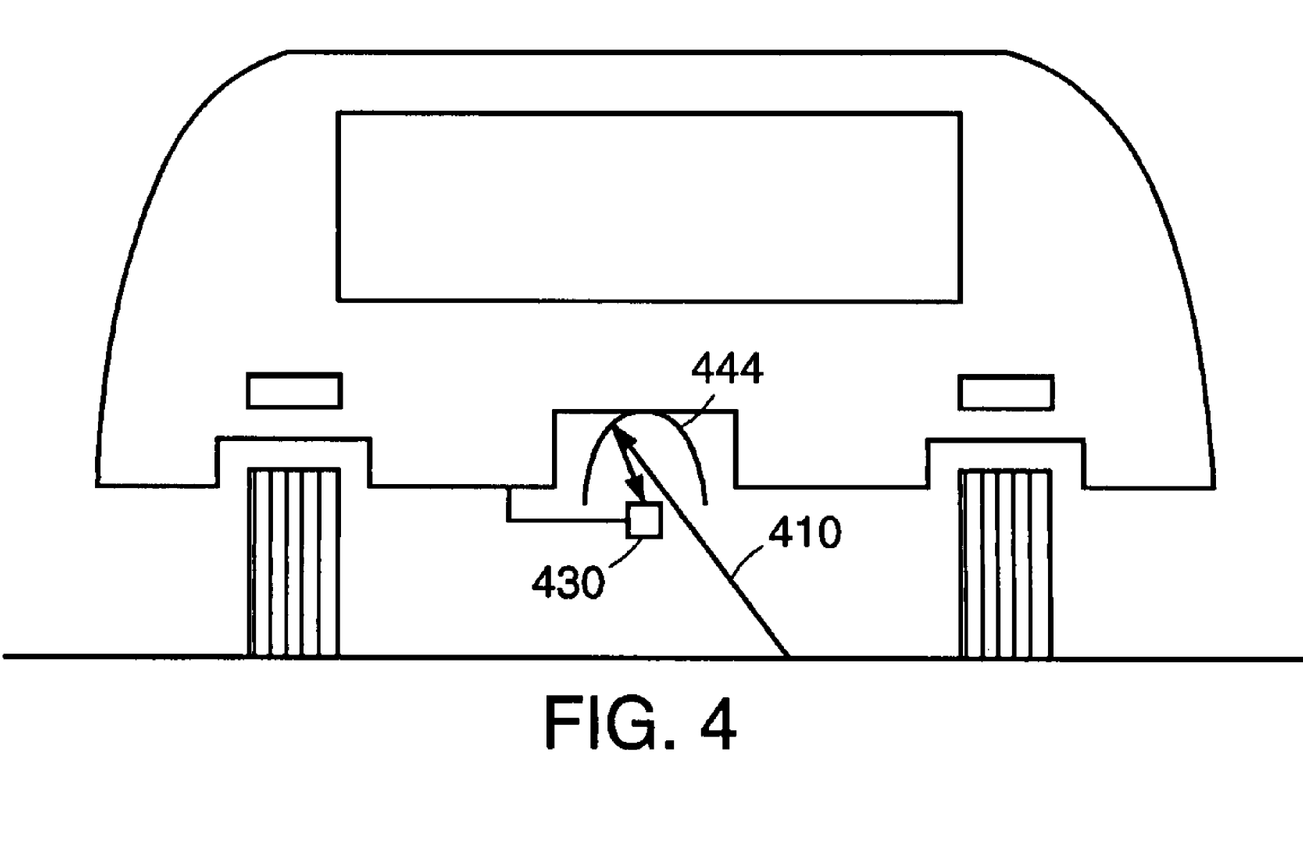
FIG. 4 shows an example of use of a parabolic reflector to concentrate infrared radiation, in accordance with an embodiment of the invention.

In a fifth embodiment 345 for separate heat capture, heat is transmitted into the vehicle through an infrared transmitting window, a lens, a filter, or a reflector; and subsequently converted into power for the vehicle in step 350. Infrared transmitting windows may be formed, for example, of germanium, zinc selenium, gallium arsenide, or inexpensive infrared plastics. Lenses may be, for example, spherical, aspherical, Fresnel, or diffractive lenses. Filters may be used to tune incoming infrared radiation to the optimum response wavelength for an infrared photovoltaic cell (or other infrared receptor). FIG. 4 shows an example of use of a parabolic reflector 444 to concentrate infrared radiation 410, in accordance with an embodiment of the invention. In one embodiment, the parabolic reflector 444 concentrates infrared radiation 410 directly onto a thermophotovoltaic cell 430 or other infrared receptor, but it may also direct the radiation into a light pipe for transmission into the vehicle and subsequent conversion into power for the vehicle; or into a heat capacitor.

In a sixth embodiment 346 for separate heat capture, a high-powered laser (or other concentrated light source) is used to heat a heat capacitor within the vehicle, the heat from which is subsequently converted to useful energy in step 350. Such a laser may be, for example, mounted at a service station or a home. In one embodiment, light from the laser travels through a series of light pipes, lenses, and reflectors (such as aspheric lenses and reflectors) to the heat capacitor; a lens or reflector may fan-out the laser beam before entering the heat capacitor. The heat capacitor may be, for example, a thermally insulated canister, with a window through which the laser beam enters. The window may be a small opening in the canister wall, or may be made of a light-transmitting substance such as zinc selenide. The laser may be, for example, a carbon dioxide laser.

Once heat is captured in step 340 of the second set of embodiments of FIG. 3, it is then separately converted into useful power for the vehicle, in step 350. In accordance with some embodiments of the invention, heat is first transferred to a central site within the vehicle, from the location of heat capture, before conversion in step 350. Such transfer may be performed using: heat conductive rods or cables; refractive or reflective elements, including light pipes; or pipes carrying a flow of a liquid or gas. Such techniques may be used to transfer heat to a central heat capacitor, which may be made of a metal or salt with a high thermal capacitance. Heat may also be transferred to the central site from hot parts of the vehicle, such as the engine block of an internal combustion engine, the exhaust train, a hot battery, a hot fuel cell, or a hot solar cell. In one embodiment, heat is transferred to the central site from the surface of the vehicle's body, which may be treated with anti-reflective paints, diffractive micro-structures, or subsurface heat conductive films or channels (such as copper film), in order to aid in heat collection. Heat may also be transferred from the vehicle's windows, which may also be treated with subsurface heat conductive films or channels.

In accordance with other embodiments of the invention, heat need not be conducted to a central site within the vehicle, but instead is converted to power near the site of collection. For example, when heat is captured by a heated plate or heat-conductive member, a thermophotovoltaic cell may be mounted behind the plate to convert heat radiated from the back of the plate directly to electricity. Such radiated heat may first be concentrated using a diffractive or Fresnel structure of the plate itself, or using a lens or reflective substance.

After heat is captured and, in some cases, conducted to a central heat capacitor, it is next converted to useful power for the vehicle, in step 350 of the second set of embodiments of FIG. 3. It should be noted that methods of power generation according to the second set of embodiments of FIG. 3 may be used alongside other methods of power generation, in providing power to a vehicle. For example, they may be used to generate some of the power for a hybrid electric vehicle, or to charge the battery of such a vehicle. Separately described embodiments of the second set of embodiments of FIG. 3 may also be used in combination with each other.

A first embodiment 351 for separately converting heat to power uses a Stirling or Brayton Cycle engine. Such an engine may derive power from a temperature differential between a central heat capacitor of the vehicle, to which heat is conducted as described above, and a cold sink. The cold sink may be created by a radiator system in contact with surrounding air, by a water system, by ice periodically loaded into the vehicle, or by the liquid phases of gases such as nitrogen or hydrogen.

A second embodiment 352 for separately converting heat to power uses a turbine powered by the expansion of a gas (such as hydrogen or steam). The gas may start in the liquid phase, and undergo a phase change before expansion in the turbine. In order to heat and expand the gas, heat may be conducted from a receptor or central heat capacitor, or may be produced by focusing infrared radiation through an infrared window into a gas containment vessel.

A third embodiment 353 uses a thermophotovoltaic cell to convert captured heat into power for the vehicle, after the heat is transferred to a central site within the vehicle. Thus, for example, infrared radiation collected from outside the vehicle, or from hot parts or surfaces of the vehicle itself, may be transferred to an internal thermophotovoltaic cell by light pipes. In another example, heat is transmitted to a central heat capacitor within the vehicle. Infrared radiation emitted by the heat capacitor is then directed onto the thermophotovoltaic cell by a heat emissive region of the heat capacitor. Infrared filters and diffractive structures may be used to tune the wavelength of infrared radiation to peak photovoltaic cell efficiencies. In one embodiment, the thermophotovoltaic cell is cooled by thermal contact with a container of liquid nitrogen or hydrogen, or another cold source within the vehicle. In such an embodiment, heat from the thermophotovoltaic cell may be used to expand the coolant gas to drive a turbine or engine.

In fourth and fifth embodiments of the second set of embodiments of FIG. 3, captured heat is converted to useful power using a thermionic, ferroelectric, or other electron emission device 354 that derives power from a thermal differential; or using a Carnot cycle engine 355.

In accordance with further embodiments according to the invention, methods 340 and 350 of powering vehicles may also be used for stationary power generation, including in combination with the methods described above for stationary power generation using the embodiments of FIGS. 2A-2C. Thus, for example, the embodiments described above for providing power to a building from a specially constructed roadway or roofing system may be used in conjunction with any of the embodiments described in FIG. 3.

As discussed above, heat from surface, such as a pavement, roof, or siding, can be harnessed for use in powering a structure or vehicle. Generally speaking, the surface acts as a heat sink but has a relatively low thermal conductivity. Thus, one or more thermally conductive materials can be used to conduct heat from one region of a heat collecting material to another.

Thermally conductive materials can be interspersed within the heat collecting material, either entirely throughout the heat collecting material or through a portion of the heat collecting material, for example, forming a thermally conductive layer within the heat collecting material. Alternatively or additionally, thermally conductive materials may be used external to the heat collecting material, such as by forming a thermally conductive layer external and adjacent to a heat collecting material layer. Such thermally conductive layers, either internal or external to the heat collecting material, may be formed from any of a variety of thermally conductive materials, such as thermally conductive rods, thermally conductive wires, thermally conductive shavings, thermally conductive particles, thermally conductive pipes, thermally conductive film or tape, thermally conductive wire mesh or screen, pipes carrying thermally conductive liquid, and pipes carrying thermally conductive gas, to name but a few. Exemplary thermally conductive materials include Aluminum, Copper, Sodium, and Zinc.

In order to improve heat flow to the second region, the density or combination of thermally conductive materials may be increased near the second region, for example, by increasing the concentration of metal shavings or particles or increasing the concentration, diameter, or thickness of rods, pipes, or wires. A desired thermal conductivity could be achieved using a combination of materials and/or densities. For example, in a roadway application, metal shavings could be mixed with asphalt within the paving material, with a layer of wire mesh added near the edge of the roadway (e.g., starting within 10 feet of the edge), with a copper rod busbar used to draw heat from the wire mesh to the destination point for power generation. Any of the above-mentioned mechanisms for converting heat and performing ancillary functions (e.g., ways for obtaining heat from the second region, concentrating the heat from the second region, converting heat to another form of energy, adding heat to the pavement, using a cold sink to aid in establishing a temperature differential, using an insulating material to reduce heat loss, storing heat, transmitting heat from one place to another, etc.) can be employed. For example, an engine that derives power from a temperature differential (e.g., a Stirling or Brayton cycle engine) can be used to convert the heat into a different form of energy. A cold sink can be used to aid in establishing a temperature differential. The relatively temperature constant subterranean earth can be used as the cold sink, for example, using thermally conductive media such as subterranean pipes that circulate fluid, wires, rods, or pipes.

Thus, embodiments of the present invention may employ thermally conductive materials to conduct heat from a first region of a heat collecting material to a second region of a heat collecting material. Heat may be drawn from the second region. The heat may be stored and/or converted to another form of energy for providing power to a structure or vehicle.

Although this description has set forth the invention with reference to several preferred embodiments, one of ordinary skill in the art will understand that one may make various modifications without departing from the spirit and the scope of the invention, as set forth in the claims.

I claim:

1. A system for harnessing incident solar heat energy for use by a heat receptor that transfers or converts the heat energy for a structure or vehicle, the system comprising:
   a roadway or parking lot surfaced with a heat collecting paving material that collects incident solar heat energy;
   a heat conductive conduit, in communication with the heat collecting paving material, for conveying heat energy from the roadway or parking lot to the heat receptor; and
   at least one thermally conductive material interspersed through at least a portion of the heat collecting paving material for conducting heat from the relatively lower thermal conductivity heat collecting paving material to the heat conductive conduit.

2. A system according to claim 1, wherein the at least one thermally conductive material includes at least one of:
   thermally conductive rods;
   thermally conductive wires;
   thermally conductive shavings;
   thermally conductive particles;
   thermally conductive pipes;
   thermally conductive film or tape;
   thermally conductive wire mesh or screen;
   pipes carrying thermally conductive liquid; and
   pipes carrying thermally conductive gas.

3. A system according to claim 1, wherein the thermally conductive material is interspersed within the heat collecting material.

4. A system according to claim 3, wherein the thermally conductive material is interspersed substantially throughout the heat collecting material.

5. A system according to claim 3, wherein the thermally conductive material is interspersed through a portion of the heat collecting material.

6. A system according to claim 5, wherein the thermally conductive material forms a layer within the heat collecting material.

7. A system according to claim 1, wherein the heat collecting material forms a first layer and wherein the thermally conductive material forms a second layer adjacent to the heat collecting material layer.

8. A system according to claim 7, wherein the thermally conductive layer sits atop the heat collecting material layer.

9. A system according to claim 8, wherein the thermally conductive layer transmits visible light but substantially prevents heat from escaping through the thermally conductive layer.

10. A system according to claim 7, wherein the thermally conductive layer sits below the heat collecting material layer.

11. A system according to claim 1, further comprising:
    means for increasing thermal flow near the conduit.

12. A system according to claim 1, wherein at least one of the density and combination of thermally conductive materials is increased near the conduit in order to increase thermal flow near the conduit.

13. A system according to claim 1, wherein the heat collecting material forms a first layer and a second layer and wherein the thermally conductive material forms a third layer between the first and second layers.

14. A system according to claim 13, wherein at least one of the heat collecting material layers further includes at least one thermally conductive material.

15. A system according to claim 1, further comprising a thermal insulating material for reducing heat loss from the heat collecting material.

16. A system according to claim 1, wherein the conduit includes a busbar.

17. A system according to claim 1, wherein the heat receptor is adapted to convert the heat to another form of energy for providing power to a structure or vehicle.

18. A system according to claim 17, wherein the structure includes a power supply to feed into a main power grid.

19. A system according to claim 17, wherein the heat receptor derives power from a temperature differential.

20. A system according to claim 19, wherein the heat receptor includes one of a Stirling cycle engine and a Brayton cycle engine.

21. A system according to claim 19, further comprising a cold sink to aid in establishing the temperature differential.

22. A system according to claim 21, wherein the cold sink includes at least one of relatively constant temperature subterranean earth, a radiator system, a water system, ice, and liquid phases of a gas.

23. A system according to claim 21, wherein the cold sink includes at least one of:
   subterranean pipes that circulate a fluid;
   wires;
   rods; and
   pipes.

24. A system according to claim 1, further comprising means for adding heat to the heat collecting material.

25. A system according to claim 1, further comprising means for storing heat obtained from the paving material.

26. A system according to claim 1, further comprising a top layer, covering at least a portion of the roadway or parking lot, that transmits visible light to the paving material but substantially prevents heat from escaping from the top layer.

27. A system according to claim 26, wherein the top layer comprises one of glass and silica.

28. A system according to claim 1, wherein the conduit includes a pipe carrying a thermally conductive fluid.

29. A system according to claim 28, wherein the fluid is one of a liquid and a gas.

30. A system according to claim 28, wherein the pipe carries a recirculating flow of fluid.

31. A system according to claim 1, wherein the conduit is near the side of the roadway or parking lot.

32. A system according to claim 1, wherein the paving material comprises asphalt.

33. A method for harnessing incident solar heat energy for use by a heat receptor that transfers or converts the heat energy for a structure or vehicle, the method comprising:
   surfacing a roadway or parking lot with a heat collecting paving material that collects incident solar heat energy, the heat collecting paving material including at least one thermally conductive material interspersed through at least a portion of the heat collecting paving material; and
   placing a heat conductive conduit in communication with the heat collecting paving material for conveying heat energy from the roadway or parking lot to the heat receptor, wherein the at least one thermally conductive material conducts heat from the relatively lower thermal conductivity heat collecting paving material to the heat conductive conduit.

34. A method according to claim 33, wherein the at least one thermally conductive material includes at least one of:
   thermally conductive rods;
   thermally conductive wires;
   thermally conductive shavings;
   thermally conductive particles;
   thermally conductive pipes;
   thermally conductive film or tape;
   thermally conductive wire mesh or screen;
   pipes carrying thermally conductive liquid; and
   pipes carrying thermally conductive gas.

35. A method according to claim 33, wherein at least one thermally conductive material is interspersed within the heat collecting material.

36. A method according to claim 35, wherein the thermally conductive material is interspersed substantially throughout the heat collecting material.

37. A method according to claim 35, wherein the thermally conductive material is interspersed through a portion of the heat collecting material.

38. A method according to claim 37, wherein the thermally conductive material forms a layer within the heat collecting material.

39. A method according to claim 33, wherein the heat collecting material forms a first layer and wherein the thermally conductive material forms a second layer adjacent to the heat collecting material layer.

40. A method according to claim 39, wherein the thermally conductive layer sits atop the heat collecting material layer.

41. A method according to claim 40, wherein the thermally conductive layer transmits visible light but substantially prevents heat from escaping through the thermally conductive layer.

42. A method according to claim 39, wherein the thermally conductive layer sits below the heat collecting material layer.

43. A method according to claim 33, wherein the at least one thermally conductive material is arranged to increase thermal flow near the conduit.

44. A method according to claim 33, wherein at least one of the density and combination of thermally conductive materials is increased near the conduit in order to increase thermal flow near the conduit.

45. A method according to claim 33, wherein the heat collecting material forms a first layer and a second layer and wherein the thermally conductive material forms a third layer between the first and second layers.

46. A method according to claim 45, wherein at least one of the heat collecting material layers further includes at least one thermally conductive material.

47. A method according to claim 33, further comprising:
   applying a thermal insulating material for reducing heat loss from the heat collecting material.

48. A method according to claim 33, wherein the conduit includes a busbar.

49. A method according to claim 33,
   wherein the heat receptor is adapted to convert the heat to another form of energy for providing power to a structure or vehicle.

50. A method according to claim 49, wherein the structure includes a power supply to feed into a main power grid.

51. A method according to claim 49, wherein
   the heat receptor derives power from a temperature differential.

52. A method according to claim 51, wherein the heat receptor includes one of a Stirling cycle engine and a Brayton cycle engine.

53. A method according to claim 51, further comprising:
   using a cold sink to aid in establishing the temperature differential.

54. A method according to claim 53, wherein the cold sink includes at least one of relatively constant temperature subterranean earth, a radiator system, a water system, ice, and liquid phases of a gas.

55. A method according to claim 53, wherein the cold sink includes at least one of:
   subterranean pipes that circulate a fluid;
   wires;
   rods; and
   pipes.

56. A method according to claim 33, further comprising:
   adding heat to the heat collecting material.

57. A method according to claim 33, further comprising: storing heat obtained from the paving material.

58. A method according to claim 33, further comprising covering at least a portion of the roadway or parking lot with a top layer that transmits visible light to the paving material but substantially prevents heat from escaping through the top layer.

59. A method according to claim 58, wherein the top layer comprises one of glass and silica.

60. A method according to claim 33, wherein the conduit includes a pipe carrying a thermally conductive fluid.

61. A method according to claim 60, wherein the fluid is one of a liquid and a gas.

62. A method according to claim 60, wherein the pipe carries a recirculating flow of fluid.

63. A method according to claim 33, wherein the conduit is near the side of the roadway or parking lot.

64. A method according to claim 33, wherein the paving material comprises asphalt.

* * * * *